(12) United States Patent
Hiland, Jr.

(10) Patent No.: US 7,124,668 B2
(45) Date of Patent: Oct. 24, 2006

(54) ALIGNMENT DEVICE

(76) Inventor: Wendel Reed Hiland, Jr., 4721 Ocean Beach Hwy., Longview, WA (US) 98632

( * ) Notice: Subject to any disclaimer, the term of this patent is extended or adjusted under 35 U.S.C. 154(b) by 65 days.

(21) Appl. No.: 10/376,868

(22) Filed: Feb. 27, 2003

(65) Prior Publication Data

US 2003/0164078 A1    Sep. 4, 2003

Related U.S. Application Data (60) Provisional application No. 60/389,902, filed on Jun. 18, 2002, provisional application No. 60/361,218, filed on Mar. 1, 2002.

(51) Int. Cl.
B26D 7/27    (2006.01)
B43L 7/00    (2006.01)

(52) U.S. Cl. ............... 83/13; 83/745; 83/468.4; 83/522.11; 83/522.17; 83/522.22; 83/522.25; 33/474; 33/476; 33/418

(58) Field of Classification Search ............ D10/62, D10/65; 33/429, 474, 476, 481, 27.01, 27.02, 33/27.03, 27.031, 32.3, 42, 333, 334, 418, 33/630; 83/468.4, 767, 574, 522.11, 522.19, 83/56, 745, 581, 522.15, 522.16, 522.17, 83/522.22, 522.25
See application file for complete search history.

(56) References Cited

U.S. PATENT DOCUMENTS

| | | | | |
|---|---|---|---|---|
| 285,601 A * | 9/1883 | Farley | ............... | 33/418 |
| 413,522 A * | 10/1889 | Kelsey et al. | ............... | 83/581 |
| 1,000,133 A * | 9/1911 | Urbach | ............... | 33/451 |
| 1,050,969 A * | 1/1913 | McLeod | ............... | D10/62 |
| 1,841,972 A * | 1/1932 | Mosley | ............... | 33/419 |
| 1,995,204 A * | 3/1935 | Ford | ............... | 33/476 |
| 2,058,330 A * | 10/1936 | Little | ............... | 33/474 |
| 2,285,897 A * | 6/1942 | Campbell | ............... | 83/473 |
| 2,632,483 A * | 3/1953 | Jamack | ............... | 83/574 |
| 2,773,523 A | 12/1956 | Hopla | | |
| 3,110,487 A * | 11/1963 | Lind | ............... | 83/581 |
| 3,623,232 A * | 11/1971 | Mahlstadt | ............... | 33/474 |
| 4,056,028 A | 11/1977 | Patterson | | |
| 4,125,490 A | 11/1978 | Hettinga | | |
| 4,179,965 A | 12/1979 | Johnson | | |
| 4,494,434 A | 1/1985 | Young | | |
| 4,513,510 A * | 4/1985 | Swanson | ............... | D10/65 |
| 4,922,621 A * | 5/1990 | Maier | ............... | 33/451 |
| 4,945,799 A | 8/1990 | Knetzer | | |
| 5,226,345 A | 7/1993 | Gamble | | |
| 5,388,340 A * | 2/1995 | Marty | ............... | 33/423 |
| 5,704,263 A * | 1/1998 | Swanberg | ............... | 33/429 |
| 5,915,808 A | 6/1999 | Stringari | | |

(Continued)

Primary Examiner—Timothy V. Eley
Assistant Examiner—Jason Prone
(74) Attorney, Agent, or Firm—Alleman Hall McCoy Russell & Tuttle LLP (57) ABSTRACT

An alignment device including a body having an alignment edge configured to guide a cutting device, an extension portion pivotal relative to the alignment edge, and at least one cutting-line indicator configured to be selectively positioned on the extension portion and configured to indicate a cutting line for the cutting device. In some embodiments, the alignment device may include a plurality of pitch selectors configured to indicate a plurality of different angles, including a first pitch selector indicating a first angle. The body further may include a level indicator configured to identify whether a plank is at first angle when the first pitch selector is selected and the body is positioned in a pitch measurement position on the plank.

6 Claims, 5 Drawing Sheets

U.S. PATENT DOCUMENTS

| | | | | |
|---|---|---|---|---|
| D416,501 S | * | 11/1999 | DiGangi et al. | D10/62 |
| 5,979,283 A | * | 11/1999 | Osborne | 83/581 |
| D428,348 S | * | 7/2000 | Hatfield et al. | D10/62 |
| 6,230,416 B1 | * | 5/2001 | Trigilio | 33/474 |
| D503,634 S | * | 4/2005 | Emerson | D10/64 |

* cited by examiner

ALIGNMENT DEVICE

CROSS-REFERENCE TO RELATED APPLICATIONS

This application claims priority from U.S. Provisional Patent Application Ser. No. 60/361,218 of Wendel Reed Hiland, Jr. for a SAW AND BLADE ALIGNMENT DEVICE, filed Mar. 1, 2002 and U.S. Provisional Patent Application Ser. No. 60/389,902 of Wendel Reed Hiland, Jr. for an ALIGNMENT DEVICE, filed Jun. 18, 2002, the disclosures of which are hereby incorporated by reference.

TECHNICAL FIELD

The present invention relates generally to alignment devices. More particularly, the present invention is directed to an alignment device for guiding a cutting device.

BACKGROUND

Many different types of alignment devices, such as straightedge and squaring devices are known. One common alignment device is a carpenter's square. The carpenter's square, also referred to as a flat square, a rafter square, a builder's square, a roofing square, etc. may have a variety of uses. Typically, carpenter's squares are L-shaped and may be used for measuring and marking patterns in framing, roofing, and stairway work. The carpenter's square also may be used as a straightedge for determining the flatness of a surface.

Such carpenter's squares may be used to ensure that a line or cut is square or plumb. For example, the L-shape of most carpenter's squares enables users to determine whether a line or cut is perpendicular from a reference surface, such as an edge of a plank. Such a determination may be made by resting a first portion of the square against the reference surface and aligning a second perpendicular portion, or leg, of the square with the line or cut. The user then may compare the position of the leg with the selected line or cut and thereby determine whether such a line or cut is square.

Additionally, some carpenter's squares enable a user to check angles of 30, 45, and 60 degrees. However, the uses of such carpenter's squares may be limited to measuring and checking the preformed angles of the alignment device. Thus, an alignment device having a 90-degree edge may be used for checking and marking 90-degree angles. Similarly, an alignment device with a 45-degree edge may be used for checking and marking 45-degree angles. However, it may be difficult to use the alignment device having a 90-degree or 45-degree edge to check and mark a 60-degree angle. Thus, versatility of such an alignment device may be limited.

Carpenter's squares further may be used to measure and mark a desired cutting line. For example, when a user wants to cut the plank with a handheld cutting device, such as a circular saw, the user may measure and mark a point on a plank where the plank is to be cut. The user may use a carpenter's square or other straightedge device to guide a marking instrument, such as a pencil or pen, from the measured point along the desired cutting line, thereby creating a marked line on the surface of the plank. After marking a desired cutting line, a user may align the blade of the saw with the marked line, and move the saw in such a manner as to ensure that the blade follows the path of the drawn line. Various conditions, such as the type of wood, weather conditions, such as rain, or byproducts from cutting, e.g. sawdust, may erase or obscure the marked line from the user making it difficult, if not impossible, for the user to accurately cut the plank. Additionally, the shape of the cutting device may prevent a user from accurately sighting the marked line while cutting. Moreover, inexperienced users may find it difficult to follow the marked line with the cutting device, and thus, although the line may have been straight, the cut, itself, may not.

SUMMARY

An alignment device including a body having an alignment edge configured to guide a cutting device, an extension portion pivotal relative to the alignment edge, and at least one cutting-line indicator configured to be selectively positioned on the extension portion and configured to indicate a cutting line for the cutting device. In some embodiments, the alignment device may include a plurality of pitch selectors configured to indicate a plurality of different angles, including a first pitch selector indicating a first angle. The body further may include a level indicator configured to identify whether a plank is at first angle when the first pitch selector is selected and the body is positioned in a pitch measurement position on the plank.

DETAILED DESCRIPTION

Figure 1:
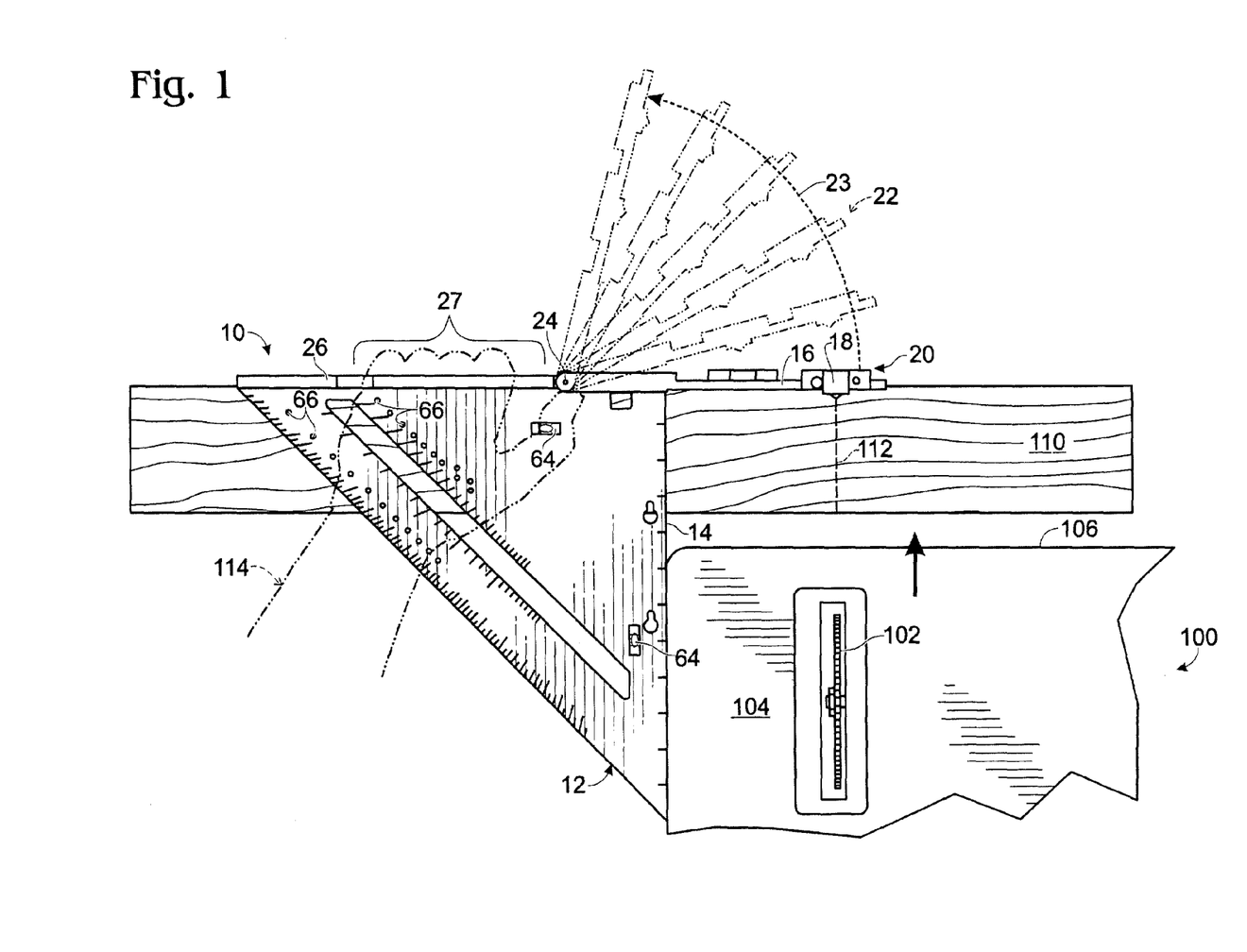
FIG. 1 is a schematic illustration of an alignment device according to an embodiment of the present invention.

An alignment device constructed according to the present invention is shown generally at 10 in FIG. 1. As described in more detail below, the uses of alignment device 10 may include, but are not limited to, use as a conventional carpenter's square, use as a straightedge, use as a saw and blade alignment device, use as a level, and/or use as a roof pitch setter, etc.

In some embodiments, as shown in FIG. 1, alignment device 10 may be used in conjunction with a cutting device 100, such as a saw or other portable cutting device. For example, alignment device 10 may be used with handheld saws, such as circular saws, reciprocating saws, jigsaws, etc.

Typically, alignment device 10 has a body 12 that includes an alignment edge 14, which may be aligned with cutting device 100. Cutting device 100 may be positioned such that it travels adjacent alignment edge 14. Typically, cutting device 100 includes a cutter mechanism 102, such as a saw blade, which may extend from any portion of cutting device 100. Cutting device 100 further may include a saw table or guard 104. Guard 104, for example, may surround cutter mechanism 102 and maintain cutter mechanism 102 at a desired position relative to the guard. As used herein, guard 104 includes any lateral extension of the saw that may be aligned with alignment edge 14 to maintain cutter mechanism 102 a select distance from alignment edge 14. It should be noted that guard 104, or other portion of cutting device 100, may be positioned, such that it abuts alignment edge 14 without hindering the operation of cutting device 100.

Body 12 of the alignment device also typically includes an extension portion 16, typically including at least one cutting-line indicator or pointer 18. Extension portion 16, also referred to herein as arm 16, may be configured to move pivotally relative to alignment edge 14. For example, extension portion 16 may be configured to be rotated from an alignment position (indicated at 20) to a pass-through position (indicated at 22). As used herein, alignment position includes a position where the extension portion extends outwardly from the body and is adapted to indicate an intended cutting line. For example, in the alignment position, extension portion 16 may be configured to be perpendicular to alignment edge 14 thereby indicating a cutting line 112 for the cutting device that is parallel to alignment edge 14. Displacement of the extension portion 16 from the alignment position 20 to a pass-through position 22 may occur upon contact with cutter mechanism 102. Thus, when the extension portion is in an alignment position, the body should be understood to be in a guide position.

Extension portion 16 may rotate or swing about pivot point 24. For example, extension portion 16 may be releasably coupled to body 12 via a hinge. The hinge may include a spring-loaded hinge or other device, which in some embodiments, may bias extension portion 16 in the alignment position. The hinged connection may enable extension portion 16 to be displaced upon contact with front edge 106 of cutting device 100. Displacement of extension portion 16 is shown by arrow 23 in FIG. 1. Although described in terms of rotation of extension portion 16, it should be appreciated that extension portion 16 may be displaced in any suitable manner, including, but not limited to, vertical rotation, retraction, lifting, etc.

To use alignment device 10 as a saw and blade alignment device, alignment device 10 may be positioned on plank 110. Plank, as used herein, may include any suitable material that is typically cut with a saw, including wood materials, plastic materials, composite materials, metal materials, etc. Positioning of alignment device 10 on plank 110 may depend on the configuration of alignment device 10 and size of plank 110. Typically, alignment edge 14 of alignment device 10 may be aligned across plank 110, such that extension portion 16 abuts the edge of plank 110. Retention edge 26 of body 12 also may abut plank 110. For example, plank 110 may be pressed against retention edge 26, thereby assuring, in the present configuration, that alignment edge 14 provides a straight guide for guiding cutting device 100.

Retention edge 26 typically is perpendicular to alignment edge 14. Extension portion 16 may be considered as pivotally connected to retention edge 26. As described in more detail below, alignment device 10 is configured to be used in both a right-hand orientation and a left-hand orientation. Thus, the orientation of alignment device 10 may be reversed, such that either side of alignment device 10 may face plank 110. Thus, by rotating the alignment device body about the first alignment edge, the body may be used in both a left-handed user orientation and a right-handed user orientation.

Typically, alignment device 10 is held in position by a user's hand 114, as shown in FIG. 1. Alignment device 10 may include a hand-gripping region 27 adapted to receive a user's hand. Once the alignment device is positioned on the plank, the user may align cutting device 100, so that a portion of the cutting device, such as guard 104, may travel adjacent to and along alignment edge 14 as cutting device 100 is drawn across plank 110 (as indicated by the arrow on cutting device 100). Thus, alignment edge 14 operates as a guide for cutting device 100.

As described above, once cutting device 100 contacts extension portion 16, extension portion 16 is displaced from an alignment position 20 to a pass-through position 22. Movement of extension portion 16 may enable cutting device 100 to cut through the entire plank 110 without loss of the guiding aid of alignment edge 14. In some embodiments, extension portion 16 may rotate or swing back towards the alignment position once cutting device 100 has cut through plank 110 and is out of the path of extension portion 16.

It should be noted that extension portion 16 may be attached to alignment device 10 in any suitable configuration that enables extension portion 16 to break away from the alignment position. For example, in some embodiments, extension portion 16 may be configured to be cut and released from alignment device 10. In such embodiments, the cut extension portion 16 may be configured for selective reattachment to alignment device 10. Alternatively, each extension portion 16 may be used once, thereby requiring a user to reattach a new extension portion 16 after each use. Similarly, known straightedge devices or squaring devices may be adapted to allow attachment of extension portion 16.

Figure 2:
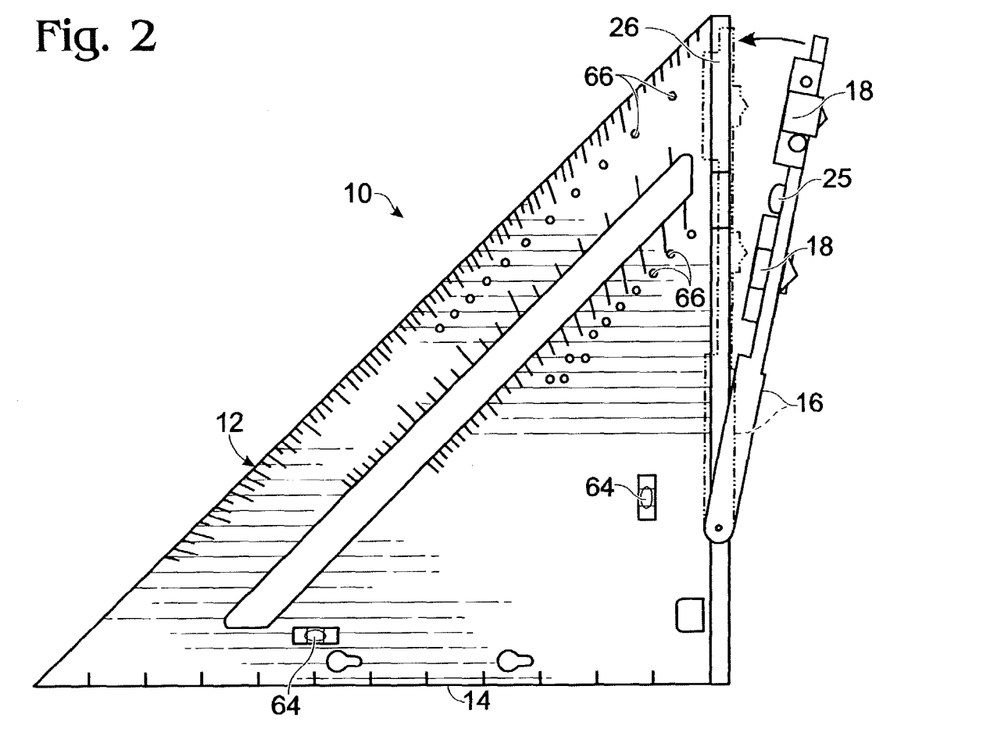
FIG. 2 is a top view of an alignment device with an extension portion in a partially open position according to an embodiment of the present invention.

It should be appreciated that extension portion 16 may be secured to alignment edge 14 in a compact or closed position, as shown in dashed lines in FIG. 2. In the closed position, extension portion 16 may be positioned substantially adjacent retention edge 26 of body 12. Detents (as schematically illustrated at 25) or other mechanisms may be used to lock extension portion 16 along retention edge 26. Positioning the extension portion in a closed position may make alignment device 10 easier to manipulate when not being used to guide a cutting device.

Referring back to FIG. 1, extension portion 16 typically includes a selectively adjustable cutting-line indicator or pointer 18. Typically, adjustable pointer 18 may be selectively positioned along extension portion 16, such that the pointer indicates the path of cutter mechanism 102 when cutting device 100 is guided by alignment edge 14. Adjustable pointer 18, shown in FIG. 3, may be any suitable device that is configured to indicate to a user the projected path of cutter mechanism 102. For example, pointer 18 may be a mechanical pointer, a laser pointer, etc.

There are many methods of setting the pointer on the extension portion for a specific cutting device. For example, a user may measure the distance from the edge of the cutting device (the portion which will contact the alignment edge of the device when cutting) to the cutter mechanism. The user may then match the measured distance by appropriately positioning the pointer on the extension portion. Alternatively, a user may draw a line on a plank using the alignment edge as a guide. Then, while maintaining the alignment device in the same position, the user may cut the plank keeping the cutting device substantially adjacent to the alignment edge, thereby using the alignment edge as a guide.

As described above, the extension portion is configured to pivot and allow the cutting device to pass through. The alignment device then may be aligned with the cut line and the pointer positioned with the cut. Thus, a user may be able to selectively position the pointer without having to cut into the extension portion.

Figure 3:
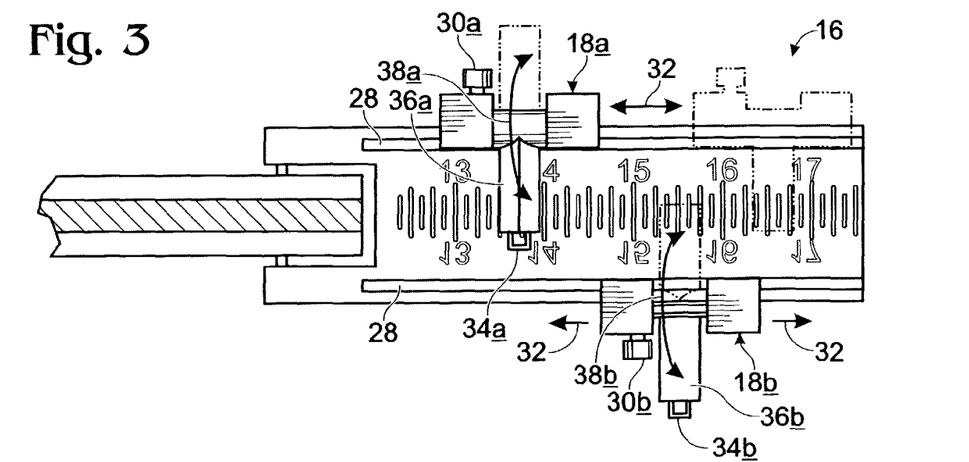
FIG. 3 is a partial side view of the alignment device of FIG. 1 including adjustable cutting-line indicators on the extension portion according to an embodiment of the present invention.

FIG. 3 illustrates two exemplary pointers, 18a and 18b. Each pointer may be selectively positioned along extension portion 16. In some embodiments, adjustable pointer 18 slidably engages extension portion 16. For example, pointers 18a and 18b may slide within a track 28 or along a rail within extension portion 16. One or more tracks may extend along the upper and lower section of extension portion 16. In other embodiments, a single track may run through the central portion of extension portion 16. Arrows 32 illustrate the lateral movement of each of the pointers along extension portion 16. It should be appreciated that other configurations which enable pointers 18a and 18b to be selectively positioned along extension portion 16 are contemplated. As described above, adjustment of the position of pointers 18a and 18b enable a user to adapt the alignment device to a specific cutting device. For example, the distance that a cutter mechanism extends from a guard may vary, and thus, the distance that the cutting mechanism extends from alignment edge 14 may vary. By providing a selectively moveable pointer, the alignment device may accommodate the use of various types of cutting devices.

Pointers 18a and 18b may be selectively retained in a desired position along extension portion 16 with a locking member or device, such as 30a and 30b. For example, locking members 30a and 30b may be screws, such as thumb screws, clips, or other removable locking devices adapted to removably secure adjustable pointers 18a and 18b in desired positions. It also should be noted that adjustable pointers 18a and 18b may include a blade width indicator or tip 34a and 34b, respectively. The blade width indicator may be used to illustrate the width of the cut of commonly-used blades. Thus, a user may accurately position pointers 18a and 18b such that the cut extends along the appropriate line for a desired cutting device and blade.

In some embodiments, the pointers may be selectively positioned away from extension portion 16. For example, in FIG. 3, pointer 18a is shown in a first position where a finger 36a is rotated downwards along extension portion 16. In such a position, finger 36a may function to indicate an intended cutting line. Finger 36a may be rotated (indicated by arrow 38a) to a second position as shown in dashed lines. Finger 36b also may be rotated between a first position and a second position. As shown in FIG. 3, finger 36b is shown in a second position, extending away from extension portion 16.

The use of two pointers, 18a and 18b, enables the alignment device to be used with either side substantially facing a plank where the extension portion extends either to the right or to the left. For example, when a user positions a cutting device to the right of the alignment device such that the left side of the alignment device contacts the alignment edge, (such as the position shown in FIG. 1), finger 36a of pointer 18a may be rotated against extension portion 16 to indicate the cutting line. Finger 36b of pointer 18b may be rotated into the second position (as illustrated in FIG. 3) such that finger 36b extends downwards and away from extension portion 16. If the alignment device is turned over, a user may indicate the cutting line by rotating finger 36b of pointer 18b against extension portion 16, as indicated by arrow 38b. With the alignment device in the above-described orientation, the user also may move finger 36a away from extension portion 16. Such a configuration enables the extension portion to lie flat against plank 110. Although two pointers have been discussed and illustrated, it should be appreciated that other configurations of alignment device including a single pointer may be used and are within the scope of the present invention.

Figure 4:
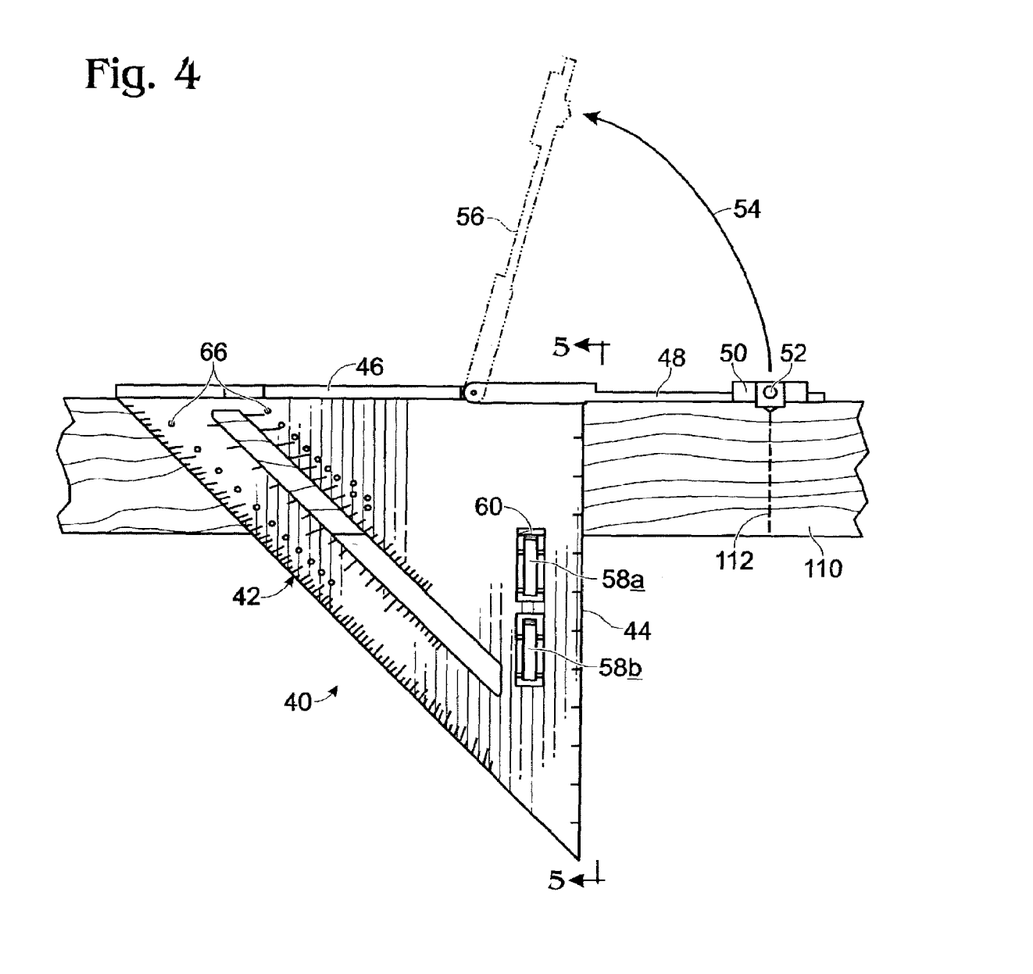
FIG. 4 is a schematic illustration of another alignment device according to an embodiment of the present invention.
Figure 5:
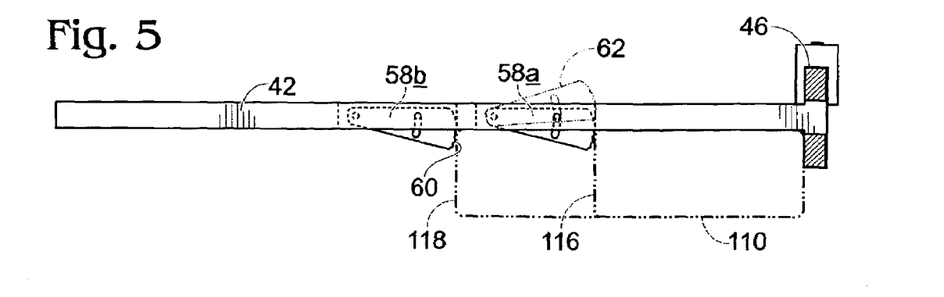
FIG. 5 is side view of the alignment device of FIG. 1 including gripping members configured to retain the alignment device against a plank.

FIGS. 4 and 5 illustrate another embodiment of an alignment device 40. Alignment device 40 has a body 42, including an alignment edge 44 and a retention edge 46. Alignment device 40 further includes an extension portion 48 with an adjustable pointer 50. Adjustable pointer 50 may be retained in position by locking member 52. Alignment device 40 operates in a similar manner as alignment device 10 described above. Thus, extension portion 48 may be adapted to break away as illustrated by arrow 54 from an alignment position to a pass-through position (indicated at 56) upon contact by a guard or other portion of a cutting device.

As shown in FIGS. 4 and 5, alignment device 40 further may include any number of gripping members, shown as 58a and 58b. The gripping members may be adapted to retain plank 110 in a fixed position between the gripping members and retention edge 46 of body 42. Gripping members 58a and 58b are adapted to retain alignment device 40 in a substantially fixed position such that it does not slide off or otherwise move from plank 110 during the cutting process. As will be understood, alignment device 40 may include any number of gripping members, and thus, alignment device 40 may have one, two, three, or more gripping members placed at various distances within body 42. In some embodiments, no gripping members may be provided on the body of the alignment device. In some embodiments, the gripping members may be pivotally attached to alignment device 40 to allow each gripping member to pivot into engagement with the plank. The gripping members may also pivot away from the body and out of the way when not being used to grip plank 110.

Gripping members 58a and 58b may be positioned parallel to alignment edge 44, as shown in FIG. 4. Additional gripping members (not shown) may be placed laterally across alignment device 40 to further grip plank 110. Each gripping member may include a plurality of protrusions or teeth 60, as shown in FIGS. 4 and 5. Gripping members 58a and 58b may be configured to frictionally engage plank 110. Protrusions 60 may be configured to accommodate variations in plank size. For example, if a specific plank is slightly larger than a standard-sized plank, protrusions 60 will still function to at least partially retain alignment device 40 against plank 110.

Gripping members 58a and 58b may be positioned such that they contact the edge of standard-sized planks 110, including, but not limited to, 1×2 inch planks, 2×4 inch planks, 2×6 inch planks, 2×8 inch planks, 2×10 inch planks, 2×12 inch planks, 5×12 inch planks, etc. For example, and as schematically illustrated in FIG. 5, gripping member 58a may be positioned approximately 3.5 inches away from retention edge 46 (to accommodate a plank having a 3.5 inch width, indicated at 116). Similarly, gripping member 58b may be positioned 5.5 inches away from edge 46 (to accommodate a plank having a 5.5 inch width, indicated at 118). Thus, when alignment device 40 is positioned on a 2×4 inch plank, protrusions 60 of gripping member 58a engage the side of plank 116, thereby retaining alignment device 40 against plank 116. Similarly, when alignment device 40 is positioned on a 2×6 inch plank, gripping member 58b may engage the side of plank 118, thereby retaining alignment device 40 against plank 118. Moreover, when alignment device 40 is positioned on a 2×6 inch plank, gripping member 58*a* pivots up through the associated slot in body 42 and out of the way of plank 118, as indicated at 62. Such pivoting enables the lower surface of alignment device 40 to rest against plank 118. The pivoting of the gripping members further enables the use of alignment device 40 in different orientations relative to plank 110. For example, gripping members 58*a* and 58*b* may be functional when alignment device 40 is turned over.

The operation of alignment device 10 and 40 as a cutting guide will now be described in more detail. Referring generally to FIGS. 1–5, a user may select a desired cutting line 112 on plank 110 by determining the desired length of the finished cut product. The user may indicate cutting line 112 by drawing a small alignment mark on plank 110 at the desired cutting point with a pencil or other marker. The alignment mark need not extend across plank 110. Instead, the alignment mark may be used to align the adjustable pointer such that the adjustable pointer indicates the intended cutting line 112 of cutter mechanism 102. Alternatively, the user may measure plank 110 and determine cutting line 112, without actually marking an alignment mark on plank 110.

In preparation of cutting the plank, the user positions the alignment device on the plank and aligns the adjustable pointer with desired cutting line 112. As stated above, the adjustable pointer may be slidably engaged with the extension portion such that alignment of the adjustable pointer may be accomplished by sliding adjustable pointer 18 along the length of the extension portion and securing the adjustable pointer in a selected position, indicating cutting line 112 of cutting device 100. If the alignment device includes another adjustable pointer, the second pointer may be folded away from the extension portion. The second adjustable pointer may be pressed snug against plank 110 helping to retain the alignment device in position on plank 110.

As the user draws cutting device 100 across plank 110, the user maintains the cutting device along the alignment edge of the alignment device. Cutter mechanism 102 cuts plank 110 along cutting line 112. During cutting, the user simply maintains the cutting device against the alignment edge, which should result in a straight-line cut. The use of the alignment device may obviate the need to draw or mark a straight line across plank 110. Moreover, the use of the alignment device makes it unnecessary for the user to use a marked line as a guide for cutter mechanism 102. Thus, even where the configuration of cutting device 100 limits visibility of a marked line, a user may still be able to cut the plank as desired. Once cutting device 100 contacts the extension portion of the alignment device, the extension portion rotates or "opens" to allow cutting device 100 to pass through.

As described briefly above, it should be noted that in some embodiments, the alignment device may be reversible. For example, the alignment edge may be positioned to the left side of cutting device 100. Alternatively, the alignment edge may be positioned to the right side of cutting device 100. Such a configuration may enable alignment device 10 to accommodate both a left-handed user and a right-handed user. Regardless of the orientation of alignment device 10, the extension portion is configured to be moveable between an alignment position and a pass-through position. Furthermore, and as discussed briefly above, gripping members may be provided, which regardless of the orientation of the alignment device operate to retain the alignment device on the plank.

Referring back to FIG. 1, body 12 also may include one or more level indicators 64, such as, but not limited to, bubble or spirit levels. Any number of level indicators 64 may be built into or incorporated within the body of the alignment device. Level indicators 64 may be positioned on the alignment device, such that they are easy to see during handling of the alignment device. Level indicators 64 may be used for level checks and angle checks. For example, the alignment device may be positioned on a surface to ascertain whether the surface is horizontal, vertical, or at a selected angle. Level indicators 64 further may be used for setting and/or determining roof pitches, as described in more detail below. Typically, the level indicators are configured to show the orientation of the alignment device body relative to a plane, such as a horizontal or vertical plane.

In some embodiments, the alignment device may include a plurality of pitch selectors, such as pitch selection holes 66 shown in FIGS. 1, 2, 4, 6, and 8. Each pitch selector may correspond to a pre-measured angle, for use in determining roof pitch. Suitable conversion tables may be attached to the body of the device further facilitating the use of the alignment device in identifying and setting roof pitches or angles. By selecting the appropriate pitch selector, a user may be able to identify and/or position a plank at a desired angle.

A set pin may be selectively positioned within any one of the pitch selection holes 66. The set pin in combination with the pitch selection holes function as a pitch selector. For example, each pitch selection hole 66 may be associated with a different angle. By inserting a set pin, such as a penny nail or other marker, into one of the plurality of holes, the alignment device may be used to determine the angle of a plank. Alternatively, the pitch selector may be of a different configuration, not requiring a set pin or a pitch selection hole. For example, each pitch selector may have a preformed projection that, upon selection, may be configured to be moved from a neutral first position to a depressed second position where the projection extends away from the body of the alignment device and operates in a manner similar to the set pin described above. It should be appreciated that other configurations for the pitch selector are contemplated and within the scope of the present invention.

Figure 6:
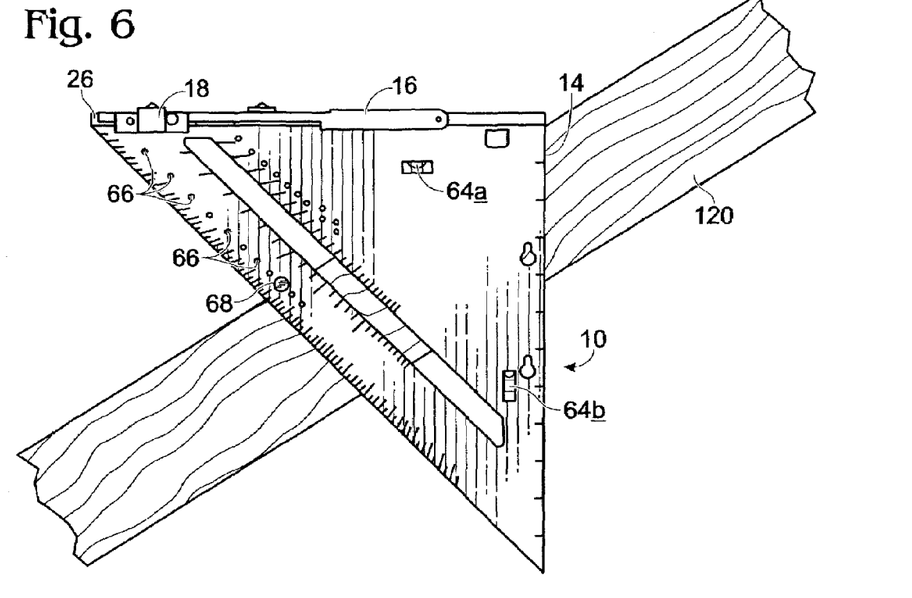
FIG. 6 is a schematic illustration of an alignment device being used to set roof pitch according to an embodiment of the present invention.

FIG. 6 illustrates the use of alignment device 10 to set roof pitch. Specifically, as illustrated, set pin 68, or other suitable marker, is positioned within the appropriate pitch selection hole 66. Alignment device 10 is then adjusted such that plank 120 rests against set pin 68 and the right angle intersection of alignment device 10, as shown in FIG. 6. The angle of plank 120 may be adjusted until level indicator 64*a* indicates that alignment device 10 is horizontal. A second level indicator 64*b* may be used to ensure that plank 120 and alignment device 10 are vertically positioned.

It should be appreciated that alignment device 10 may be used to check or determine pitch angle in addition to setting pitch angle. Typically, such checks are made by guessing the pitch, positioning alignment device 10, and checking to see if level indicator 64*a* indicates that the pitch is accurate. It should be noted that the position of set pin 68 may have to be adjusted to precisely determine the pitch of a plank or roof. Once level indicator 64*a* indicates that the alignment device is horizontal, the position of set pin 68 within the appropriate pitch selector 66 may be used to indicate the pitch of the roof. Conversion tables located on the alignment device further may be used to determine the pitch angle.

Figure 7:
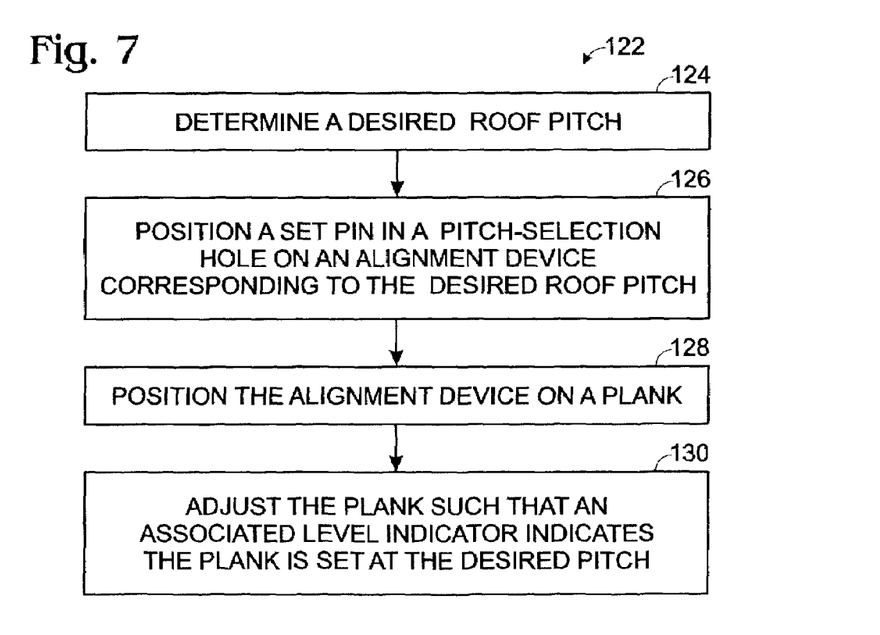
FIG. 7 is a flow chart of a method for setting roof pitch according to an embodiment of the present invention.

A method for setting roof pitch is shown generally in FIG. 7 at 122. The method includes determining a desired roof pitch (at 124) and positioning a set pin in the appropriate pitch selection hole on the alignment device (at 126). The appropriate pitch selection hole may be determined by the markings on the alignment device. The method further includes positioning the alignment device on a plank or other suitable support (at 128) and adjusting the plank such that an associated level indicator indicates the plank is set at the desired pitch (at 130). It should be appreciated that the level indicator may be incorporated within, or external of, the alignment device. In embodiments where the level is external of the alignment device, a user may position a level indicator, such as a spirit level, on the upper surface of the alignment device and adjust the plank until a level surface is indicated.

It should be noted that extension portion 16 may be in a closed position where extension portion 16 is removably locked against retention edge 26. Positioning of extension portion 16 in a closed position enables the alignment device to be easily manipulated when determining roof pitches or other angles. In some embodiments, extension portion 16 may be removable from the alignment device. In other embodiments, the alignment device may not include an extension portion.

Figure 8:
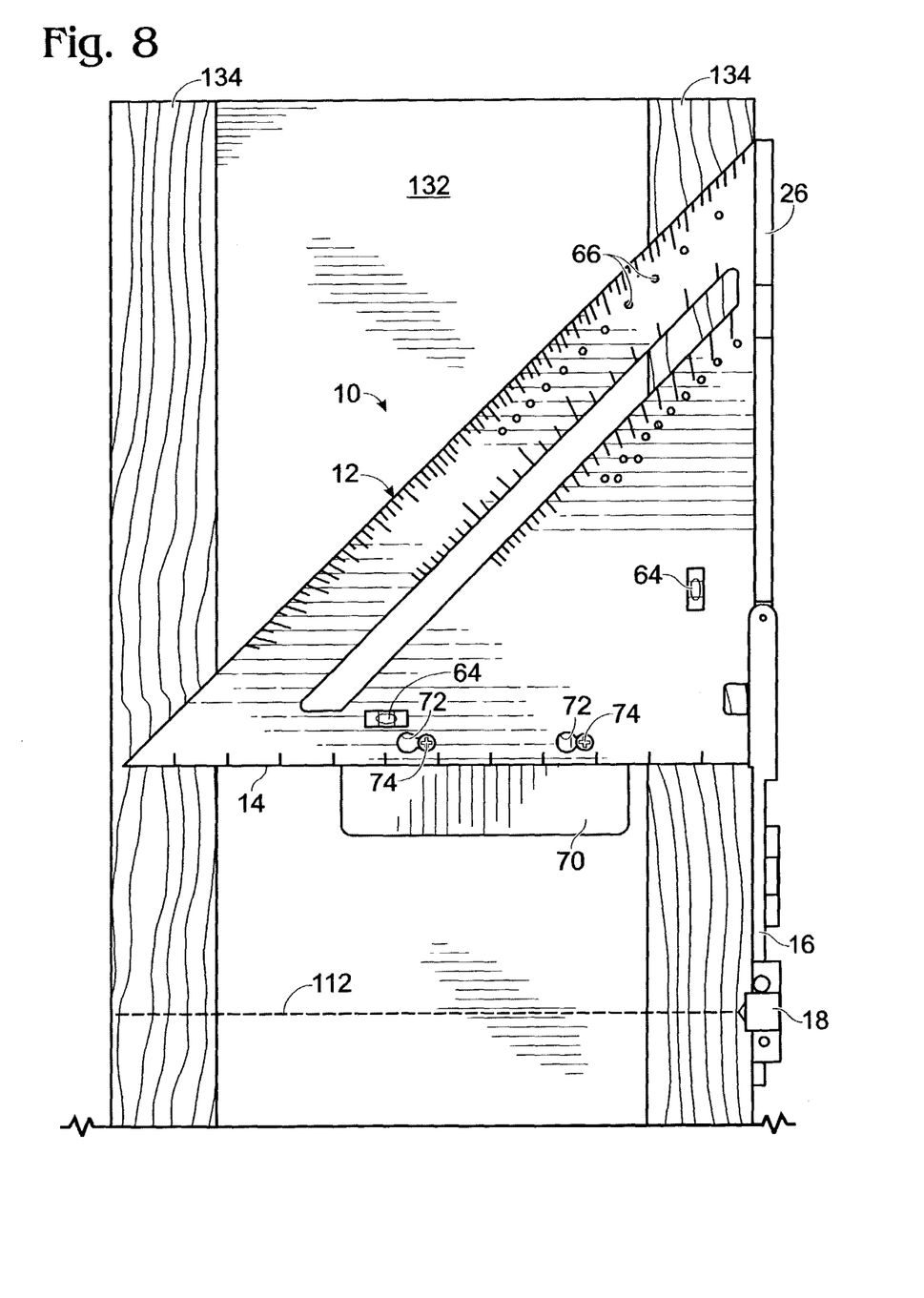
FIG. 8 is a top view of an alignment device with a cutting device support.

FIG. 8 illustrates another embodiment of alignment device 10. Specifically, in FIG. 8, body 12 of alignment device 10 includes a cutting device support 70. Cutting device support 70 may be used to support a cutting device (not shown in FIG. 8) when plank 132 has a non-uniform contour. For example, plank 132 may be an I-joist or other similar beam. For example, plank 132 may have rails 134 which extend upward and outward from the body of plank 132. Cutting device support 70 is substantially rigid and is configured to provide a bridge for a cutting device, such that the cutting device is maintained along a substantially lateral plane as it cuts through the non-uniform contour plank 132. The cutting device support 70 functions to maintain the cutting device in an operable position.

Cutting device support 70 typically is configured for quick removal from, and attachment to, body 12 and may be selectively detached and attached to the body of the alignment device. For example, in some embodiments, body 12 may have cavities 72 adapted to receive posts 74, which extend from cutting device support 70. Posts 74 may be adapted to be inserted and slid within cavities 72, such that the cutting device support is substantially locked in a support position. In some embodiments, cutting device support 70 may be selectively positioned with cavities 72.

It should be noted that alignment device 10 generally has the shape of a triangle; however, other configurations providing a straightedge are possible. For example, the alignment device may be an L-shaped square, a framing square, or other straightedge device.

Alignment device 10 may be made of any suitable material, including, but not limited to, plastics, metals, and composites, etc. It should be noted that extension portion 16, adjustable pointer 18, and cutting device support 70 may be made out of similar or different materials.

It should be noted that the drawings described above depict a plurality of embodiments for an alignment device. The drawings illustrate exemplary embodiments that depict a variety of elements and subelements. It is within the scope of the invention that these elements and subelements may be selectively embodied in devices alone or in combination with one or more other elements and/or subelements, regardless of whether the particular selected element, subelement, or combination thereof is specifically illustrated in the figures.

Thus, while the present description has been provided with reference to the foregoing embodiments, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

What is claimed is:

1. A method of guiding a saw comprising:
positioning an alignment device body on a plank such that an extension portion of the alignment device body is pivotal relative to the alignment device body;
moving at least one adjustable cutting-line indicator along the extension portion to mark an intended cutting line;
aligning the saw so that a portion of the saw travels adjacent to the alignment device body, and a cutter mechanism of the saw travels in line with the at least one adjustable cutting-line indicator; and
contacting the extension portion with the saw such that the extension portion is displaced from an alignment position to a pass-through position.

2. The method of claim 1, wherein moving the at least one adjustable cutting-line indicator along the extension portion to mark an intended cutting line includes sliding the at least one adjustable cutting-line indicator along a track on the extension portion to a user-selectable position.

3. The method of claim 2, further comprising securing the at least one adjustable cutting-line indicator with a locking member.

4. The method of claim 1, wherein moving the at least one adjustable cutting-line indicator along the extension portion to mark an intended cutting line includes rotating the at least one adjustable cutting-line indicator to an operable position and securing the at least one adjustable cutting-line indicator with a locking member.

5. The method of claim 1, further comprising selectively attaching a cutting device support to maintain the saw in an operable position.

6. The method of claim 1, further comprising prior to positioning the alignment device body on a plank, releasing the extension portion from a compact position wherein the extension portion is substantially adjacent to the alignment device body to a second position wherein the extension portion extends outwardly from the body.

* * * * *